United States Patent
Ishikawa et al.

[11] Patent Number: 6,104,746
[45] Date of Patent: *Aug. 15, 2000

[54] SPREAD SPECTRUM COMMUNICATION SYSTEM

[75] Inventors: Hiroyasu Ishikawa; Hideyuki Shinonaga; Hideo Kobayashi, all of Saitama, Japan

[73] Assignee: Kokusai Denshin Denwa Co., Ltd., Tokyo

[*] Notice: This patent issued on a continued prosecution application filed under 37 CFR 1.53(d), and is subject to the twenty year patent term provisions of 35 U.S.C. 154(a)(2).

[21] Appl. No.: 08/925,319

[22] Filed: Sep. 8, 1997

[30] Foreign Application Priority Data

Sep. 25, 1996  [JP]  Japan ................................ 8-272853

[51] Int. Cl.[7] .................................................. H04B 15/00

[52] U.S. Cl. .......................................... 375/140; 375/130

[58] Field of Search ................................... 375/140, 130, 375/142, 147; 370/342, 335, 366, 347, 321, 319, 320

[56] References Cited

U.S. PATENT DOCUMENTS

| | | | |
|---|---|---|---|
| 5,319,672 | 6/1994 | Sumiya et al. ........................... | 375/208 |
| 5,343,495 | 8/1994 | Lovell et al. ............................ | 375/206 |
| 5,345,245 | 9/1994 | Ishikawa et al. ........................ | 342/357 |
| 5,479,442 | 12/1995 | Yamamoto .............................. | 375/206 |
| 5,499,267 | 3/1996 | Ohe et al. ............................... | 375/206 |
| 5,610,939 | 3/1997 | Takahashi et al. ...................... | 375/206 |
| 5,625,639 | 4/1997 | Tomita et al. ........................... | 375/200 |
| 5,737,362 | 4/1998 | Hyun et al. ............................. | 375/206 |
| 5,793,794 | 8/1998 | Kato et al. .............................. | 375/200 |
| 5,796,774 | 8/1998 | Kato et al. .............................. | 375/206 |

FOREIGN PATENT DOCUMENTS 0 701 337 A2  3/1996  European Pat. Off. .

OTHER PUBLICATIONS

"Performance of Orthogonal Multi–Carrier CDMA in a Multipath Fading Channel", Sourour et al, *IEEE Proceedings of the Global Telecommunications Conference*, vol. 1, Nov. 28, 1994, pp. 390–394.

"Multicarrier Transmission Technique in Cellular Mobile Communications Systems", Reiners et al, *IEEE Proceedings of the Vehicular Technology Conference*, vol. 1, Conf. 44, Jun. 8, 1994, pp. 1645–1649.

"Computer Networks", Tanenbaum, pp. 84–86, and pp. 127–130.

Multitone Spread Spectrum Multiple Access Communications System in a Multipath Rician Fading Channel:, Vandendorpe, *IEEE Transactions on Vehicular Technology*, vol. 44, No. 2, May 1995, pp. 327–337.

*Primary Examiner*—Chi H. Pham
*Assistant Examiner*—Khai Tran
*Attorney, Agent, or Firm*—Arent Fox Kintner Plotkin & Kahn

[57] ABSTRACT

A combined channel or a composite channel is to be transformed into a plurality of element channels. The composite channel may be either shared by a plurality of communication stations on time division multiplex basis, or used by a single communication station. In a transmit side, a serial data information which is called a composite channel is transformed to parallel form associated with a plurality of element channels, each of which is spread by using a single common PN code. Each spread element channels are frequency converted to radio frequency so that the center carrier frequency is offset from that of adjacent element channel by an integer multiple of information transmission rate of each element channel, and frequency band occupied by spread element channels overlap with one another. Each element channels thus spread and frequency converted are combined on frequency axis, and transmitted to a receive side. Thus, all the element channels are synchronized with one another because of the use of a single common PN code, and receive level of signal of each element channel is uniform, irrespective of a number of communication stations, and therefore, high quality communication with no interference is obtained in a relatively narrow frequency band.

5 Claims, 11 Drawing Sheets

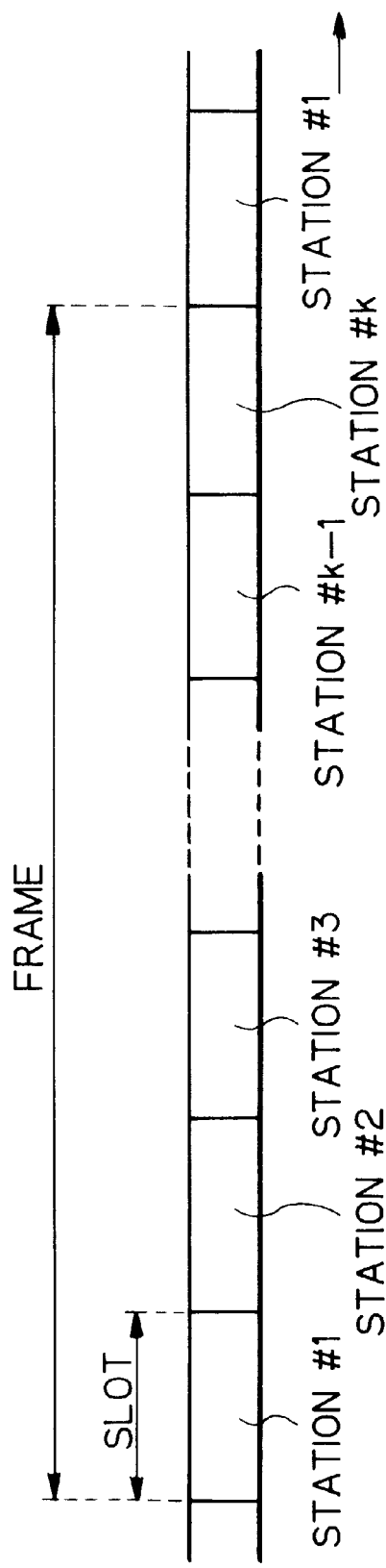
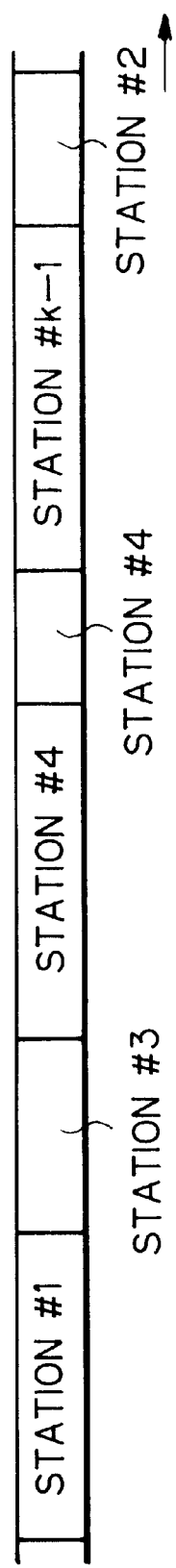

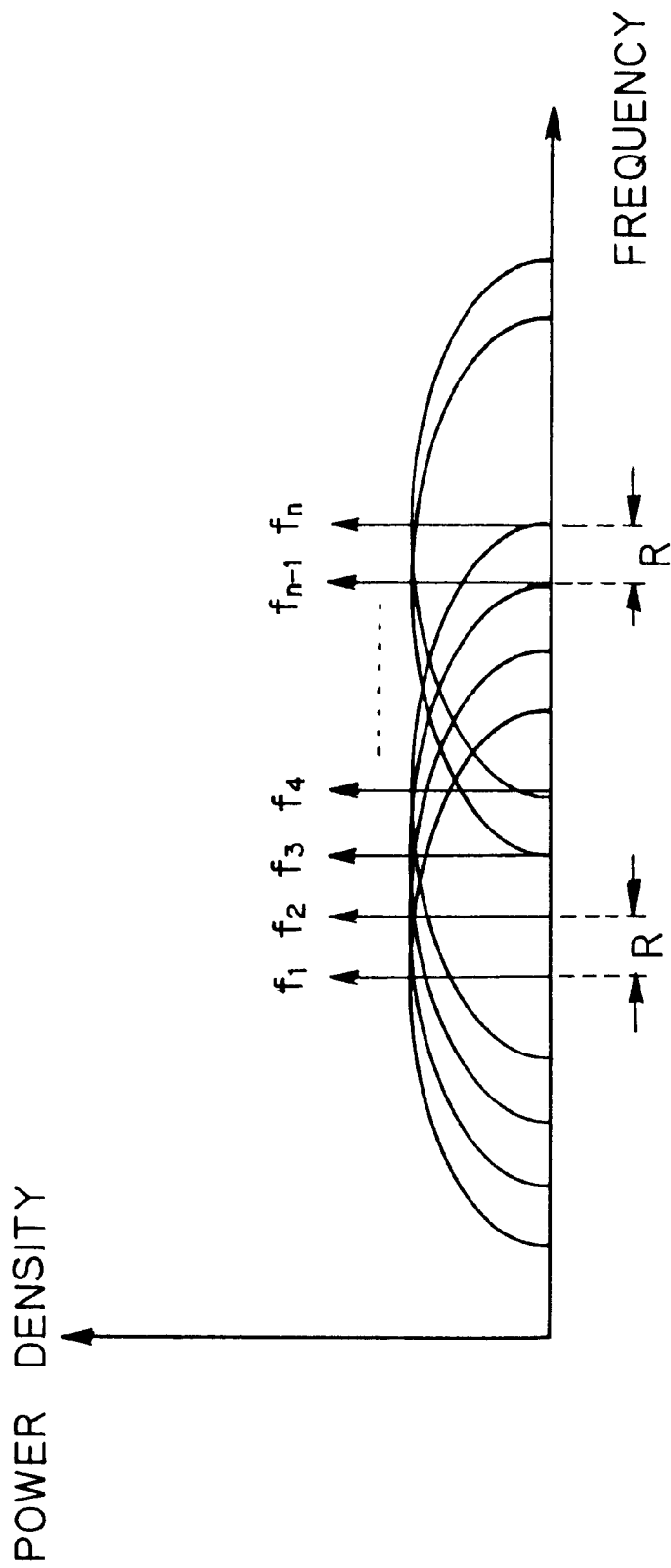

SPREAD SPECTRUM COMMUNICATION SYSTEM

FIELD OF THE INVENTION

The present invention relates to a spread spectrum communication system which is used for a multiple access system with direct sequence spread spectrum (DS-SS) system. The present invention is used either in a radio communication system including a satellite communication system for fixed stations, a satellite communication system for mobile stations, a fixed land station radio communication system, a mobile land station communication system, a radio LAN system, a local radio communication system, or in a wired communication system including an optical communication system, and a coaxial cable communication system.

BACKGROUND OF THE INVENTION

In a prior DS-SS communication system, a code division multiple access (CDMA) system has been used, in which each station is assigned a distinct pseudo noise code (PN code), and each station is recognized based upon the specific PN code, and the desired signal is derived based upon the fact that the correlation between the codes of PN code is small.

FIG. 8 shows a block diagram of a prior CDMA system, in which k number of stations may communicate at the same time. The numerals 100-1 through 100-k are an information signal in digital form of each station, the numerals 101-1 through 101-k are a multiplier for multiplication of an information signal 100-1 through 100-k, and a pseudo noise code (PN code) 102-1 through 102-k, the numerals 102-1 through 102-k are a pseudo noise code for spread spectrum of an information signal 100-1 through 100-k, the numerals 103-1 through 103-k are a modulator for modulating a base band signal obtained from the multipliers 101-1 through 101-k with the carrier frequencies obtained by the local oscillators 104-1 through 104-k, the numerals 105-1 through 105-k are a band pass filter for deriving spectrum component necessary for transmission from the modulated signal.

The spread spectrum communication system may be used both in a wired communication system, and a radio communication system. The SS (Spread Spectum) signals of each stations are multiplexed in transmission medium, and the multiplex process is equivalently expressed by an adder 106 in FIG. 8.

The numeral 107 is a band pass filter for deriving a frequency component necessary for demodulation from a receive signal, the numeral 112 is an AGC (automatic gain control) for providing constant level of an output of the filter 107, the numeral 108 is a frequency converter for converting a received high frequency to an intermediate frequency, the numeral 109 is a local oscillator for the frequency conversion, the numeral 110 is a demodulator for detecting an information transmitted by each transmit station in a frequency restricted receive signal, and the numeral 111 is a received information signal obtained by the demodulator 110.

In the prior art of FIG. 8, the information signal of each transmit station is directly spread spectrum modulated by using pseudo noise codes PNl through PNk which have small correlation with one another. The local frequency of each local oscillators 104-1 through 104-k is the same as f1The modulated signals by the modulators 103-1 through 103-k are frequency restricted by the band pass filters 105-1 through 105-k, and are transmitted towards a receive side.

A receive station receives the multiplexed signals 1 through k with common carrier frequency f1 as shown in FIG. 9. A demodulator obtains only a desired signal through correlation detection which uses the same pseudo noise code as that which is used in a transmit station for spreading an information signal.

In a DS-SS communication system, a maximum length sequence (M sequence) is generally used as a pseudo noise code for spectrum spread direct modulation. However, the number of M sequence is 18 for a pseudo code with code length 127, 16 for the code length 255, or 48 for the code length 511. Therefore, in a CDMA communication system which discriminates a transmit station by a pseudo noise code must use an M sequence with long code length so that many stations may transmit simultaneously. However, the use of a pseudo noise code with long code length for many simultaneous transmit stations complicates the generation of the code, the structure of a correlator, and the process for demodulation.

When more stations transmit at the same time, the transmit frequency must be changed as shown in FIG. 10, since the same pseudo noise code must not be used with the same carrier frequency. FIG. 10 shows the example that the first group of the stations 1 through k uses the carrier frequency f1, and the second group of the stations 1 through k uses the carrier frequency f2. When m times of the stations are desired to transmit simultaneously, in other words, each pseudo noise code is used m times repetitively, the frequency band must also be m times, therefore, if the frequency band to be used is restricted, the number of stations for simultaneous transmission is then restricted.

One modification of a prior art is to assign a pseudo noise code to a transmit station upon request of the transmit station, instead of assigning a fixed pseudo noise code to each transmit station. However, this system is complicated in control and an apparatus.

One prior solution for solving the above problems is CFO-SSMA system (Carrier Frequency Offset-Spread Spectrum Multiple Access Method) which is described in JP patent laid open publication 268189/1993, and U.S. Pat. No. 5,319,672. In that system, a plurality of transmit stations use a common pseudo noise code for spread spectrum modulation for independent transmit signals, and the center frequencies of each transmit signals are offset as shown in FIG. 11, so that each frequency band of each transmit signal overlaps with one another. When each transmit station uses a carrier frequency which is offset from one another by the frequency equal to integer multiple of signal transmission rate, then, a receive side can derive a desired signal by using a matched filter in association with transmitted SS signal (PN code), and may demodulate the signal with no interference by other signals.

The CFO-SSMA system which uses a carrier frequency offset from one another by an integer multiple of signal transmission rate has the advantage that each transmit station may transmit a signal with no interference with another station even when the same pseudo noise code is used in a spread spectrum communication system. Therefore, even when a number of pseudo noise codes is restricted, each pseudo noise code is re-used by shifting a center frequency of each transmit station by an integer multiple of a transmission signal rate, and thus, a number of stations which communicate simultaneously is considerably increased in a restricted frequency band. Further, as each transmit station uses the same pseudo noise code, an apparatus may be simple and small.

However, the CFO-SSMA system has the disadvantage that the communication with no interference is possible only when the timing of the spread spectrum modulated signals transmitted simultaneously coincides with one another in a receive side. In other words, when a spectrum spread modulated signal is asynchronous in a receive side, a signal from a transmit station suffers from interference with another signal, and the signal quality is decreased.

Further, when an AGC (automatic gain control) is used for providing constant receive level, the receive level of each signal depends upon a number of signals, since an AGC controls a receive level constant irrespective of a number of multiplexed signals. Therefore, when a receive station regenerates a clock timing through the comparison of a peak value of a correlation of a desired signal with a predetermined threshold, a receive level of a desired signal when many signals are multiplexed would be decreased because of the operation of an AGC, and the peak value of the correlation would be lower than the threshold. In that case, the signal reproduction would be impossible. In order to solve the above problem, the threshold level must be changed with a number of multiplexed signals, however, the implementation of that would complicate an apparatus, and therefore, it is not practical solution.

As described above, a multiple access spread spectrum communication system using a common pseudo noise code in all the transmit stations has the disadvantages that each spread spectrum modulation signal would interfere with each other in a receive side unless a timing of all the signals coincides with each other in a receive side, and causes the deterioration of signal quality of a transmission circuit, although it has the advantage that the restricted frequency band is used with high efficiency, and a simple communication apparatus may be used.

A synchronization among stations would solve the above problem through the communication between a plurality of transmit stations and a plurality of receive stations, however, the protocol for high precision synchronization would be complicated, and an apparatus for that would be complicated.

SUMMARY OF THE INVENTION

It is an object of the present invention, therefore, to overcome the disadvantages and limitations of a prior spread spectrum communication system by providing a new and improved spread spectrum communication system.

It is also an object of the present invention to provide a spread spectrum communication system which removes deterioration of signal quality due to timing error between a communication signal and a PN code, and non-uniform signal level of each element channels in a receive side.

The above and other objects are attained by a spread spectrum communication system comprising; a serial-parallel converter for converting a serial information data into a plurality of parallel information data, and each parallel information data being put into a plurality of element channels in parallel form so that each element channels are synchronized with one another, and has predetermined transmission rate; a single PN code generator for all the element channels; a plurality of spread spectrum modulators for spreading signal of each element channels on frequency axis by using a PN code generated by said PN code generator; a plurality of local oscillators for providing a plurality of local frequencies with offset frequency equal to an integer multiple of said transmission rate of each element channel; a plurality of modulators for modulating spread spectrum signal of each element channel with related local frequency; and a combiner for combining all the modulated signals to send combined signal to a transmission line.

BRIEF DESCRIPTION OF THE DRAWINGS

The foregoing and other objects, features and attendant advantages of the present invention will be appreciated as the same become better understood by means of the following description and the accompanying drawings wherein;

FIG. 5 shows an embodiment of time division signal transmission by composite communication channel in spread spectrum communication system according to the present invention, FIG. 6 shows an embodiment in which each stations monitor the use of composite communication channel in spread spectrum communication system according to the present invention, FIG. 11 shows an embodiment of channel location in a carrier frequency offset—spread spectrum multiple access system, which the present invention uses.

DESCRIPTION OF THE PREFERRED EMBODIMENTS

The present invention is the improvement of said CFO-SSMA system (JP patent laid open 268189/1993, U.S. Pat. No. 5,139,672).

One of the features of the present invention is the concept of a combined channel or a composite channel which is either a single high rate data or multiplexes a plurality of communication data. The composite channel is converted into parallel form so that a plurality of element channels are provided through serial-parallel conversion.

Therefore, it should be appreciated that each element channels has equal power to one another. This means that a receive level of each element channel to a SAW matched filter in a receive side is equal to one another, irrespective of a number of communication channels, since a number of element channels is always fixed. Further, as receive level of each element channel is constant, a threshold level for data decision in a receive side may be fixed, and no adaptive control for that threshold is necessary.

Further, each element channels are synchronized with one another, in other words, the chip synchronization of communication signal in an element channel with a PN code is simply satisfied by using a common PN code to all the element channels. Therefore, no interference due to synchronization error occurs in the present invention, and an apparatus is simple since no complicated apparatus for accurate synchronization is necessary.

Each element channels are spread so that frequency offset among adjacent channels is equal to an integer multiple of communication rate of an element channel, and spread spectrum of an element channel overlaps with that of another element channel on frequency axis.

Figure 3:
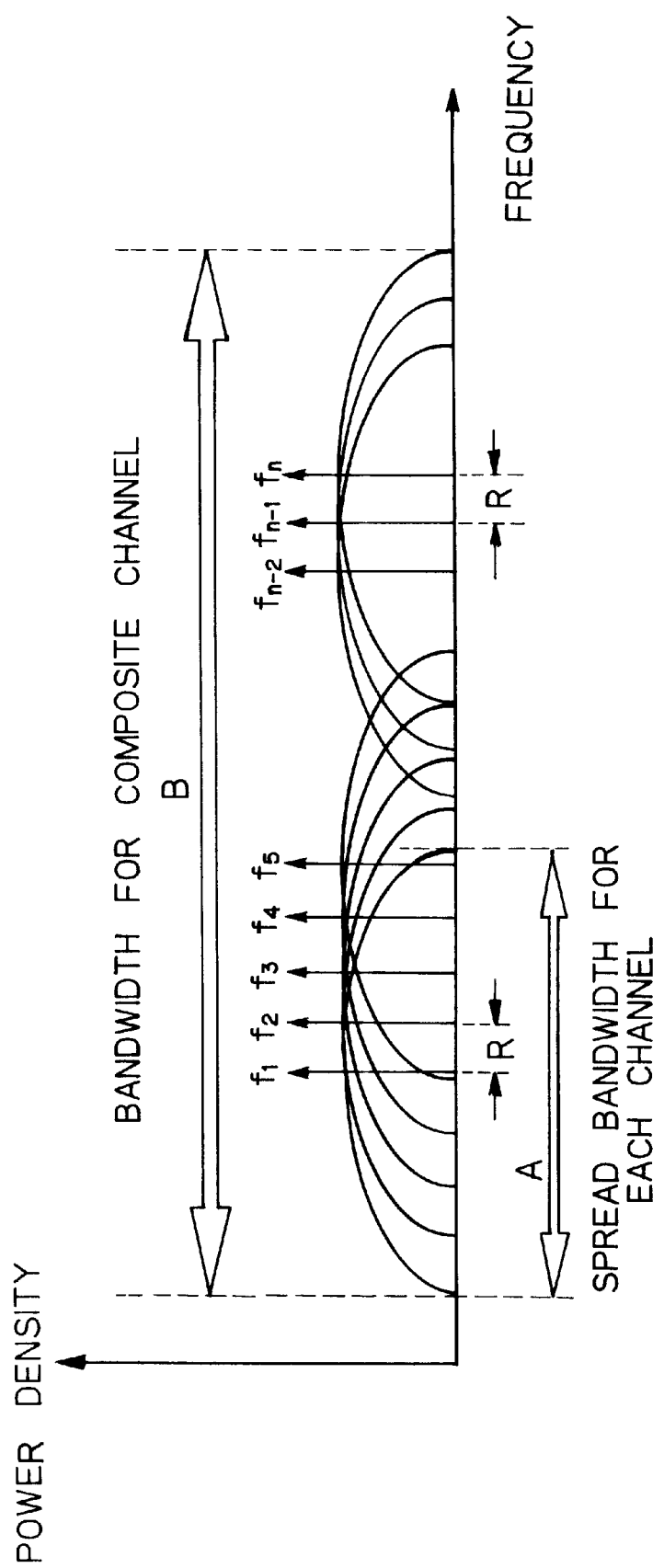
FIG. 3 shows an embodiment of a composite communication channel according to the present invention.

FIG. 3 shows the frequency spectrum of a composite channel in the embodiment of the present invention. In FIG. 3, the first element channel is spread to frequency band A with center carrier frequency f1. Similarly, the second element channel is spread to frequency band A with center carrier frequency f2, where the offset of center frequency, or f2–f1, is R, which is an integer multiple of transmission rate of each element channel. Similarly, another element channel is spread to frequency band A so that frequency offset of the center carrier frequency with that of adjacent element channels is R. The total band width of all the element channels, or the bandwidth of a composite channel is B, which is of course much smaller than (A×n), where n is a number of element channels.

Figure 4:
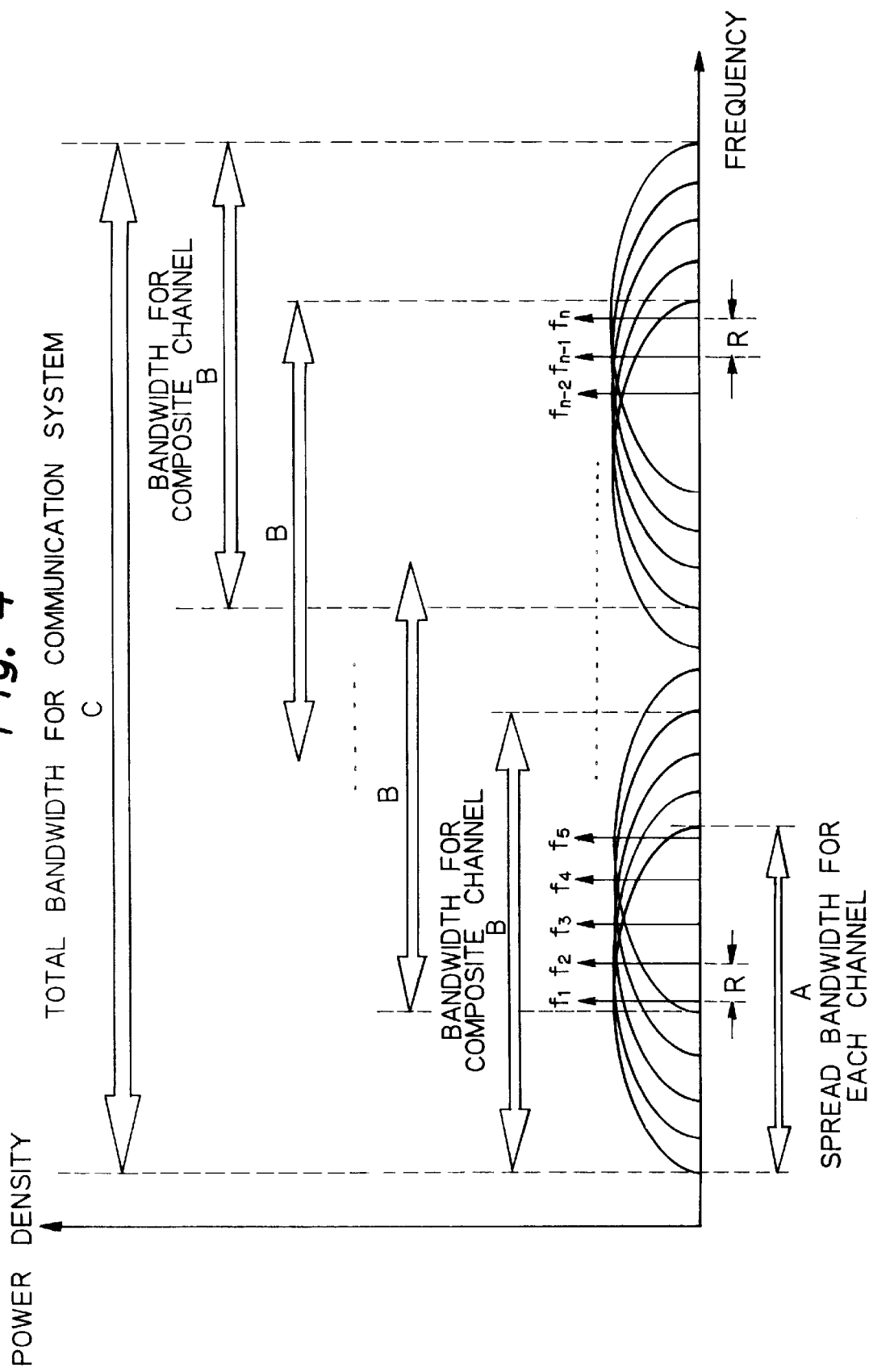
FIG. 4 shows an embodiment for a plurality of composite communication channels according to the present invention.

FIG. 4 shows a modification of the present invention. In FIG. 4, the element channels each having band width A are classified into a plurality of composite channels each having bandwidth B. The total bandwidth for all the composite channels is C. Each communication station uses one of the composite channels. It should be noted in FIG. 4 that all the composite channels are synchronized with one another. If no synchronization is assured, each composite channels must be allocated so that they do not overlap with one another on frequency axis.

FIGS. 5 and 6 show two alternatives of communication in a composite channel. In FIG. 5, the frame is separated to a plurality of slots each having a fixed equal time length. The communication stations #1 through #n share the frame. Each slot is assigned to a specific station. The time length of a slot in FIG. 5 is fixed. The time length of a slot, the repetition timing of a slot, and assignment of a slot to each station may be designed arbitrary.

In FIG. 6, each communication station measures whether a composite channel is free or not, and when it is free, the station starts to send the signal according to information quantity to be transmitted. Therefore, time length of a slot is variable. FIG. 6 has the feature that bandwidth for communication is used efficiently.

Figure 7:
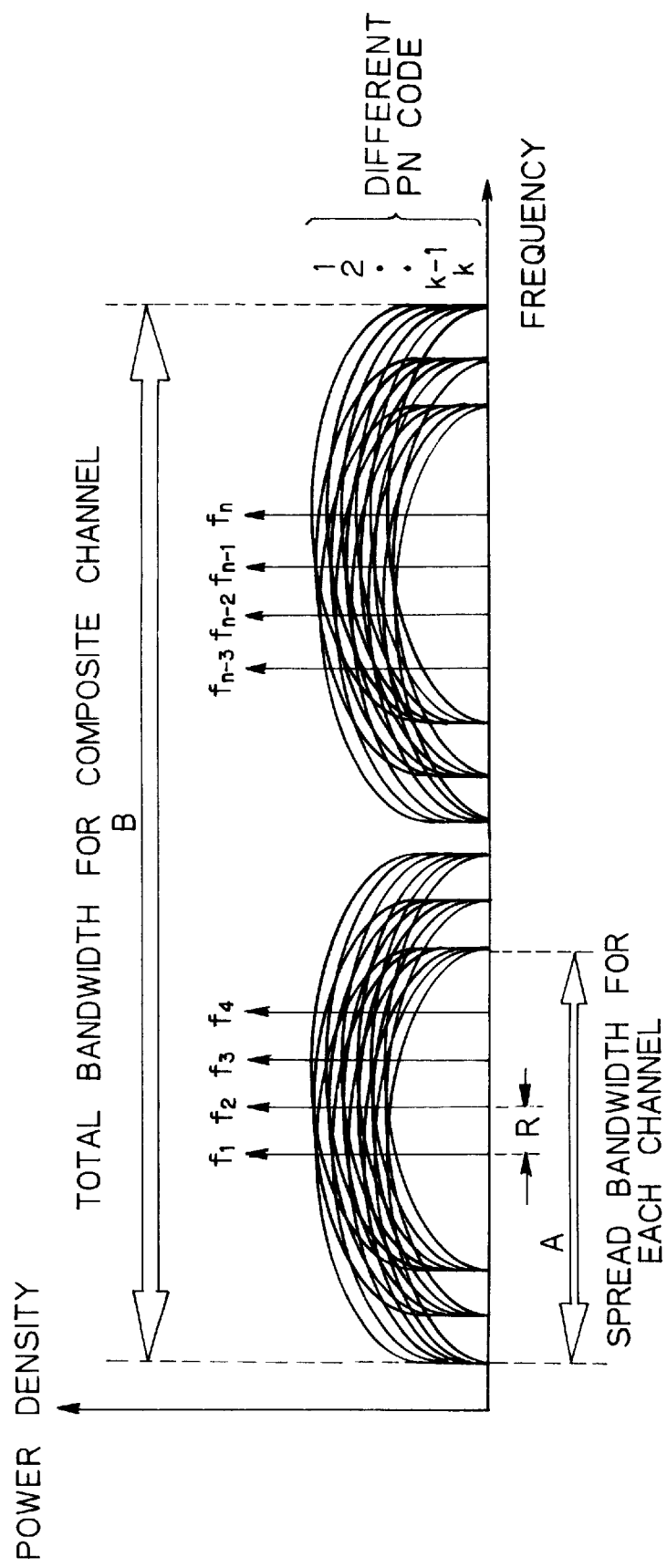
FIG. 7 shows an embodiment in which each station uses an independent pseudo random code for spreading spectrum in composite communication channel in spread spectrum communication system according to the present invention.
Figure 8:
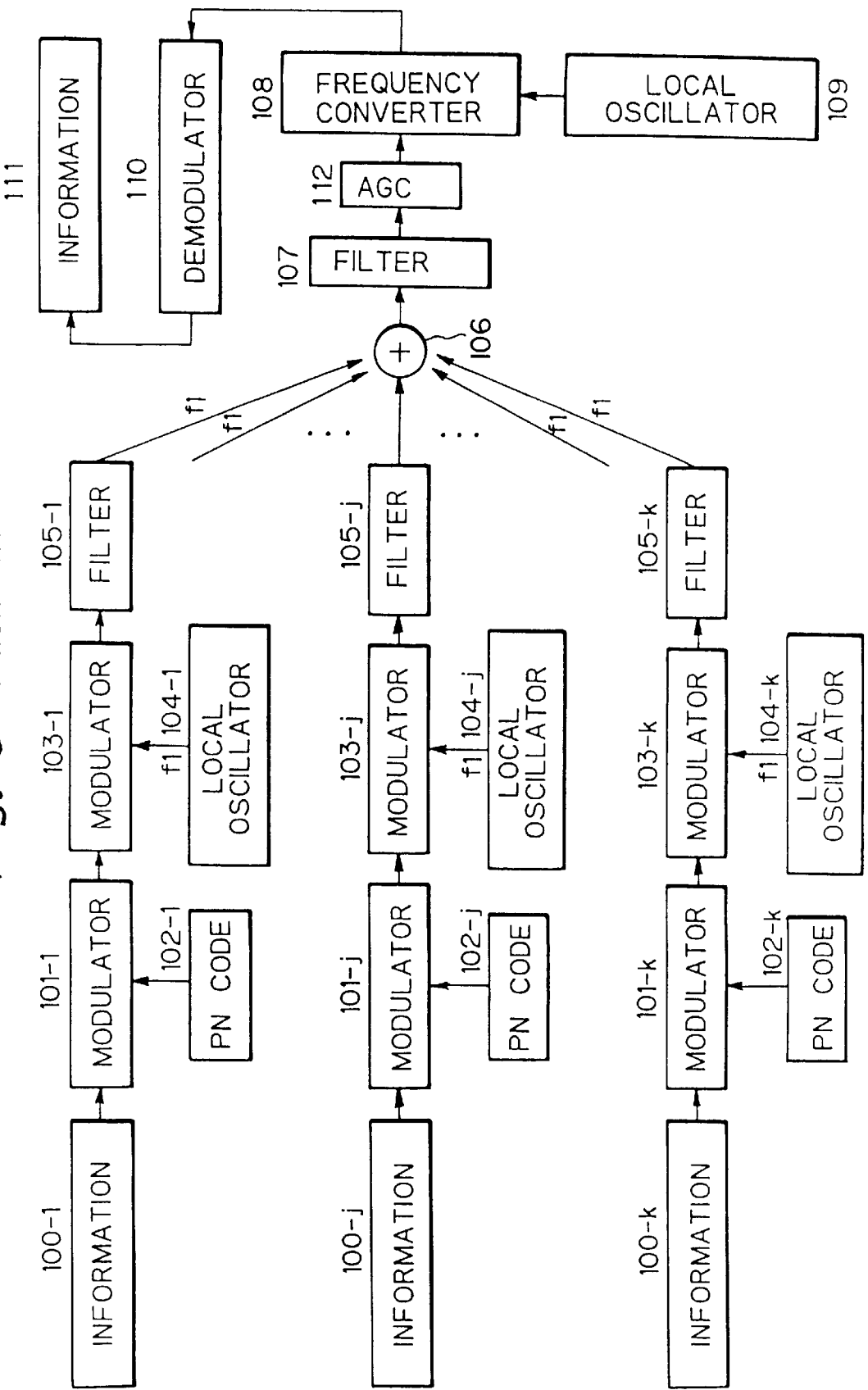
FIG. 8 is a block diagram of a prior spread spectrum communication system.
Figure 9:
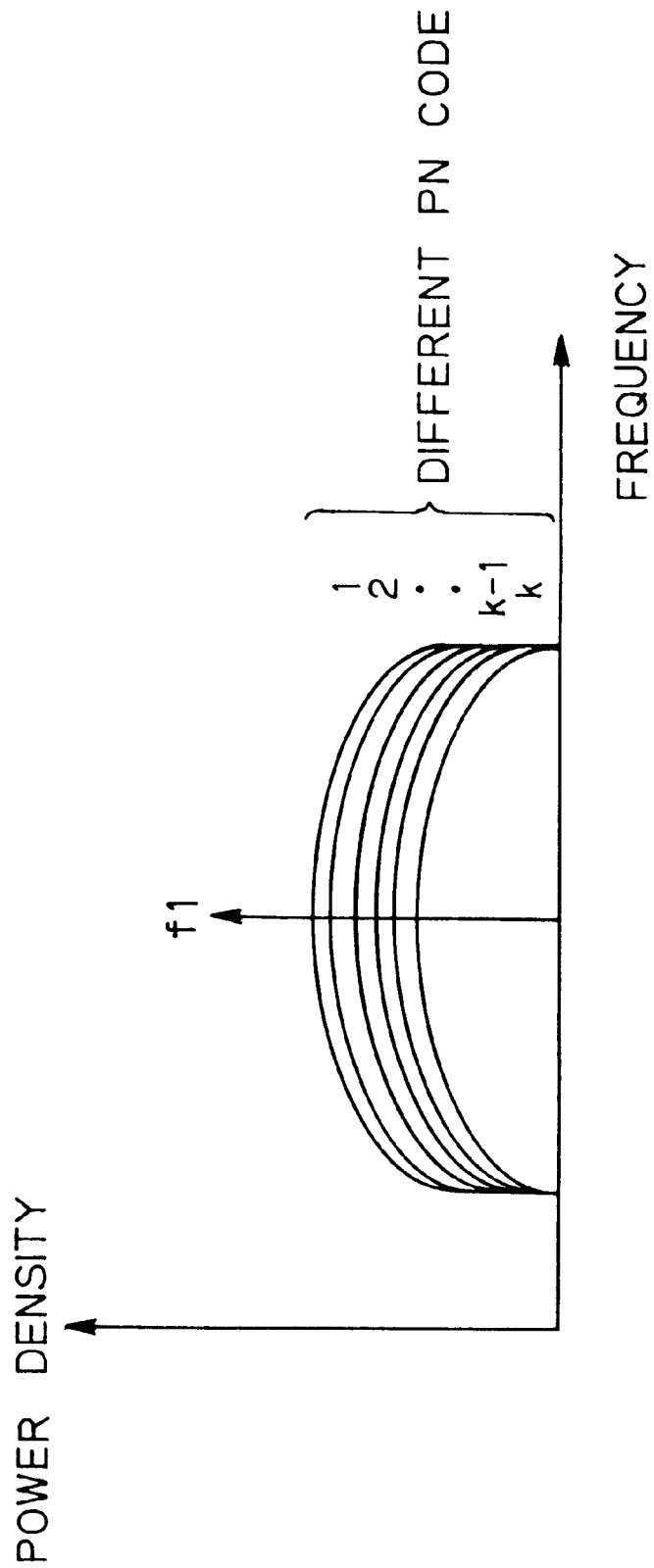
FIG. 9 shows an embodiment for multiplexing channels in a prior spread spectrum communication system.
Figure 10:
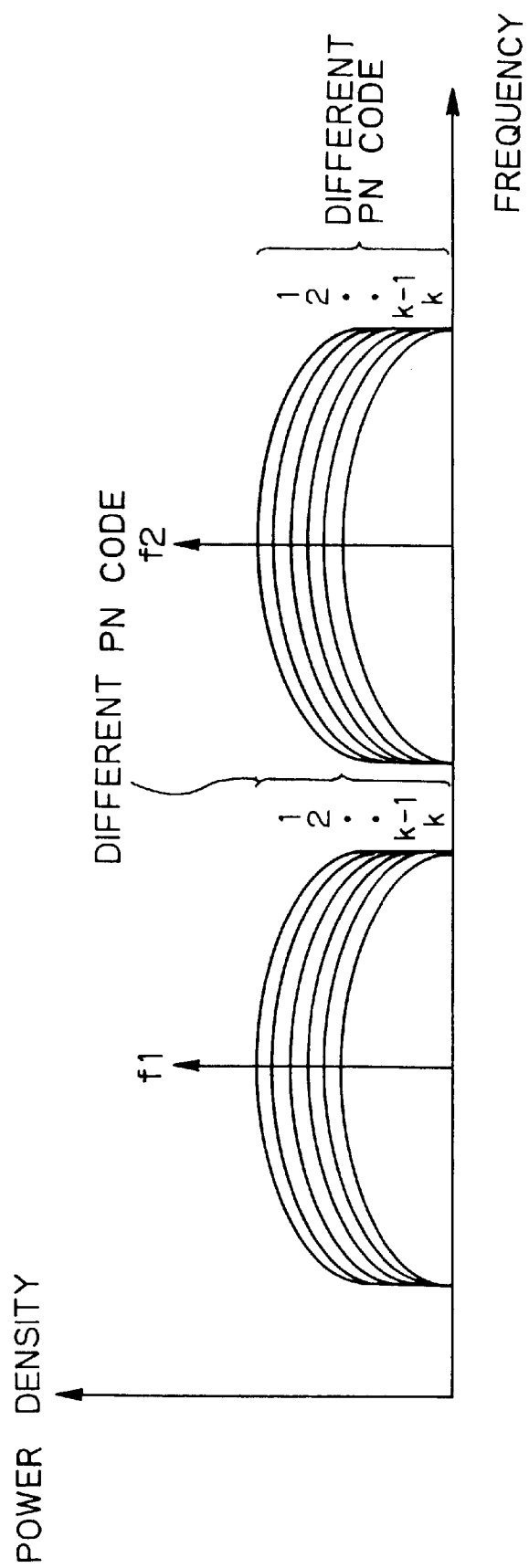
FIG. 10 shows an embodiment of channel location of spread spectrum signals in a prior spread spectrum communication system.

FIG. 7 shows frequency spectrum of another modification of the present invention. In FIG. 7, a plurality of composite channels are used. In this case, each composite channel is spread by using specific PN code. Therefore, FIG. 7 is the combination of FIG. 3 embodiment and a prior code multiplex system (CDMA). FIG. 7 has an assumption that all the composite channels are synchronized with one another with high accuracy.

Figure 1:
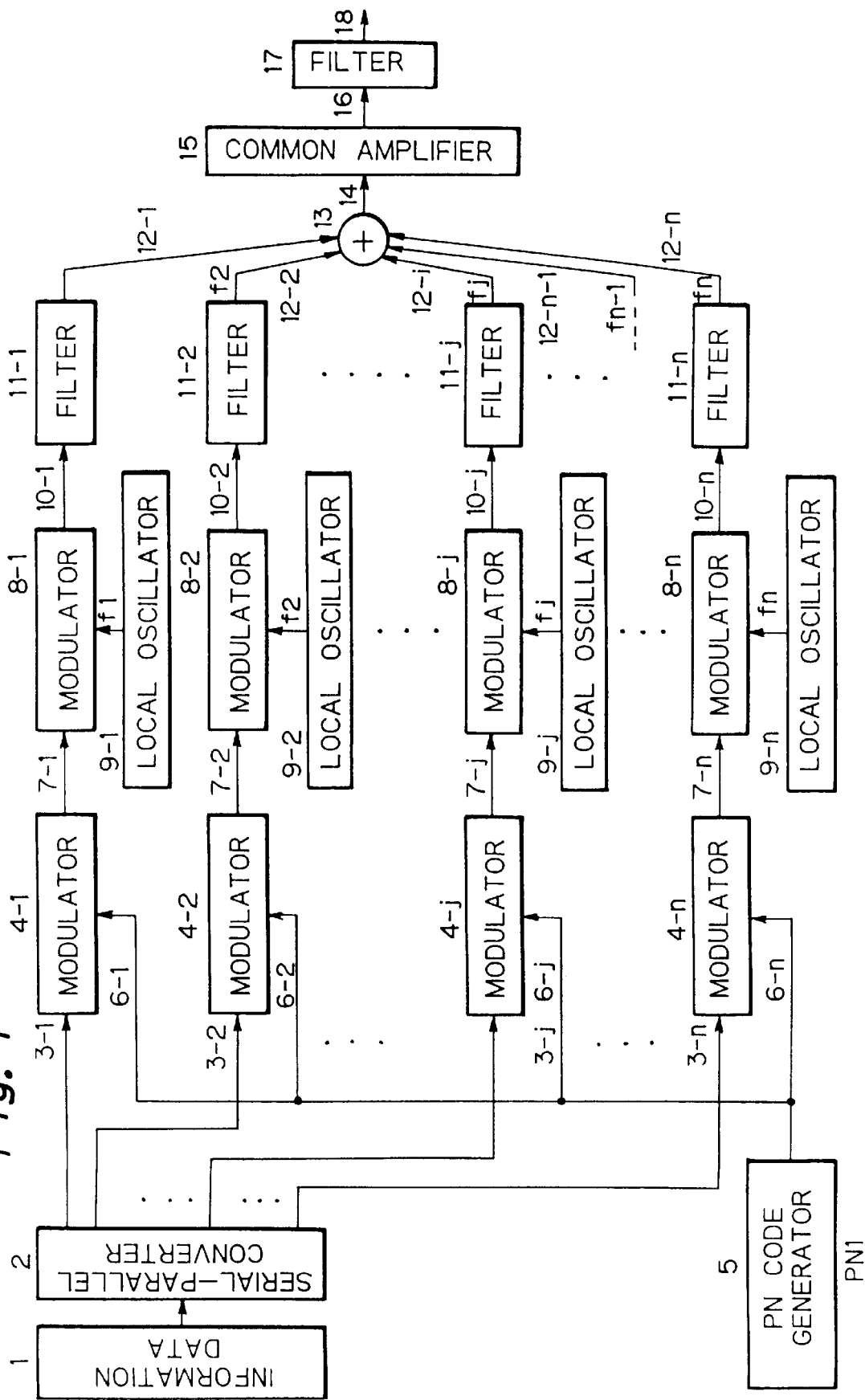
FIG. 1 is a block diagram of a transmitter for spread spectrum communication system according to the present invention.

FIG. 1 shows a block diagram of a transmitter in the spread spectrum communication system according to the present invention, in which it is assumed that a number of channels composing a composite communication channel is n, in other words, the n channels may communicate simultaneously. In the figure, the numeral 1 is information data to be transmitted, 2 is a serial-parallel converter which distributes input data in serial form to n number of outputs sequentially, 3-1 through 3-n are modulated information data in each communication channel, 4-1 through 4-n are a modulator which provides binary multiplication of an information and each of pseudo noise codes 6-1 through 6-n provided by a PN (pseudo noise) code generator 6-1 through 6-n. The numerals 6-1 through 6-n signal, 7-1 through 7-n are a spectrum spread base band signal to be transmitted in each communication channel, 8-1 through 8-n are a modulator for modulating each of base band signals 7-1 through 7-n obtained by each of modulators 4-1 through 4-n with carrier frequencies f1 through fn, 9-1 through 9-n are a local oscillator for generating a carrier frequency f1 through fn for each communication channel, 10-1 through 10-n are spread spectrum signal converted to high frequency region by spread spectrum process, 11-1 through 11-n are a band pass filter for deriving frequency component necessary for transmission in a modulated signal, 12-1 through 12-n are spread spectrum signal obtained by the band pass filters 11-1 through 11-n, 13 is a signal combiner for combining spread spectrum signals 12-1 through 12-n of each channels, 14 is a combined spread spectrum signal of the output of the combiner 13, 15 is a common amplifier for amplifying combined spread spectrum signal, 16 is combined spread spectrum signal amplified by the amplifier 15, 17 is a band pass filter for removing undesired radiation outside of communication band, and 18 is an output signal of the band pass filter 17.

The present spread spectrum communication system may be used either in a radio communication system, or a wired communication system. The combined spread spectrum signal 18 is transmitted to another station through one of the wireless communication system and the wired communication system. Although the figure shows that an information data transmitted by the communication station is originated by a single information source, it is of course possible to assign independent information sources for each communication channels. Further, it is possible to assign a plurality of communication channels for a plurality of information sources. Further, it is possible to modulate a signal first with a local oscillator and then with a pseudo noise random code.

Next, the operation of a transmitter for spread spectrum communication system is described. It is assumed that each communication channels have the same information rate, the same spread rate, and the same clock timing as one another.

The information data 1 is distributed to output ports of each element channel by the serial-parallel converter 2. Then, the set of data which are serial-parallel converted are sent to each modulators 4-1 through 4-n of each element channels at the same timing as one another. The modulators 4-1 through 4-n provides the multiplication between periodic PN code 6-1 through 6-n and information data series 3-1 through 3-n which are an output of the serial-parallel converter 2 so that the spread spectrum signal group 7-1 through 7-n are obtained.

The multiplication of the spread code 6-1 through 6-n and the information data group 3-1 through 3-n is carried out at the completely same timing as one another by the modulators 4-1 through 4-n. Therefore, no synchronization error between communication channels occurs. That error has been a problem in a prior art.

Then, the spread spectrum signals 7-1 through 7-n are frequency-converted by the local oscillators 9-2 through 9-n to a frequency having the center frequency f1 through fn. An output of the modulators 8-1 through 8-n pass the band pass filters 11-1 through 11-n.

Finally, filter output signals which relate to communication channels, respectively, is multiplexed with one another on frequency axis by the signal combiner 13. Then, an output of the signal combiner 13 is amplified by the common amplifier 15 to the signal power requested in a communication circuit. The filter 17 removes the undesired radiation.

Then, an output of the filter 17 is transmitted to a communication medium.

In the above operation, the timing among all the communication channels coincides completely with one another, since all the modulators 4-1 through 4-n are supplied with the common pseudo noise (PN) code generated by the single PN code generator 5.

Figure 2A:
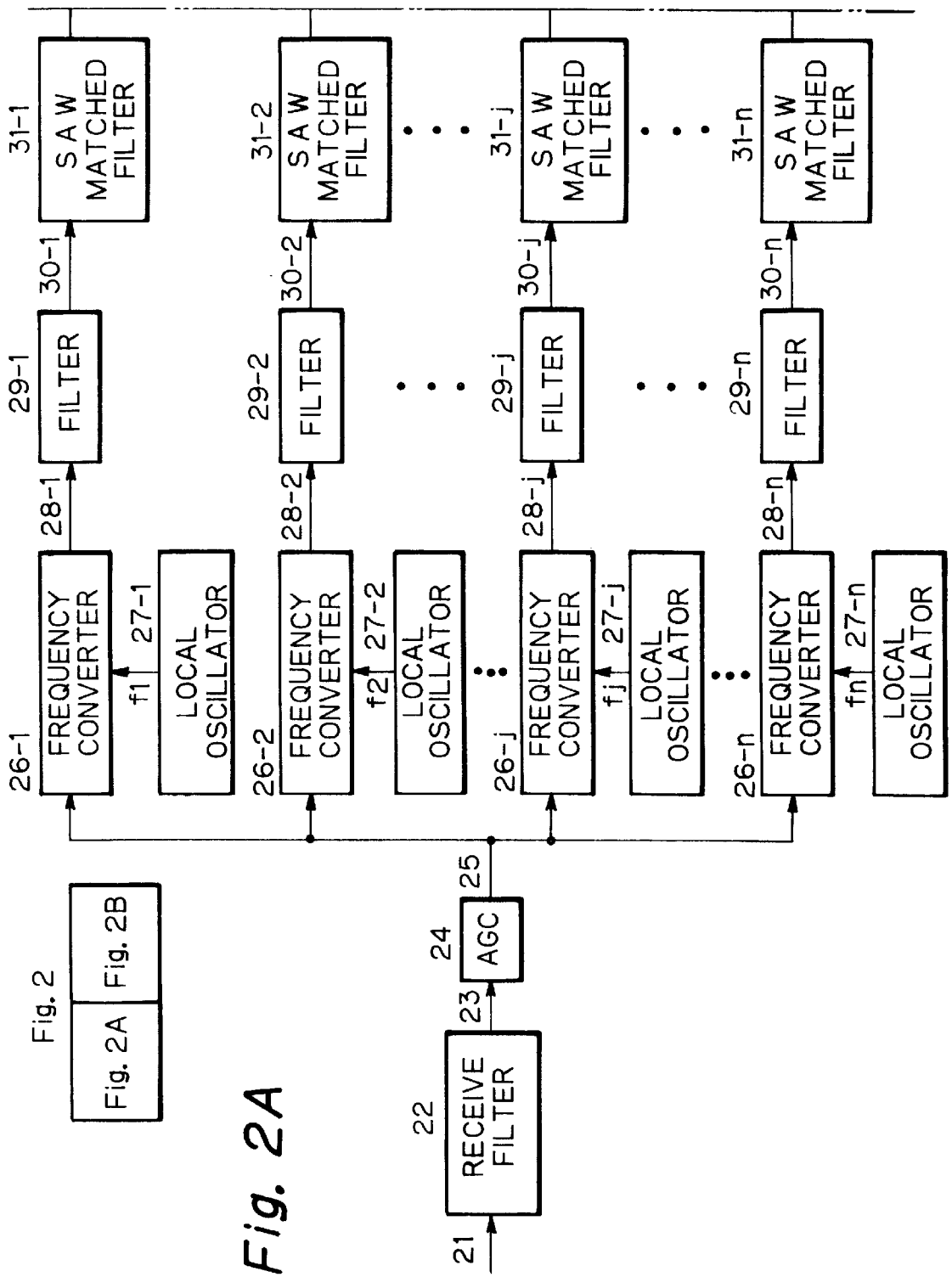
FIG. 2 is a block diagram of a receiver for spread spectrum communication system according to the present invention.
Figure 2B:
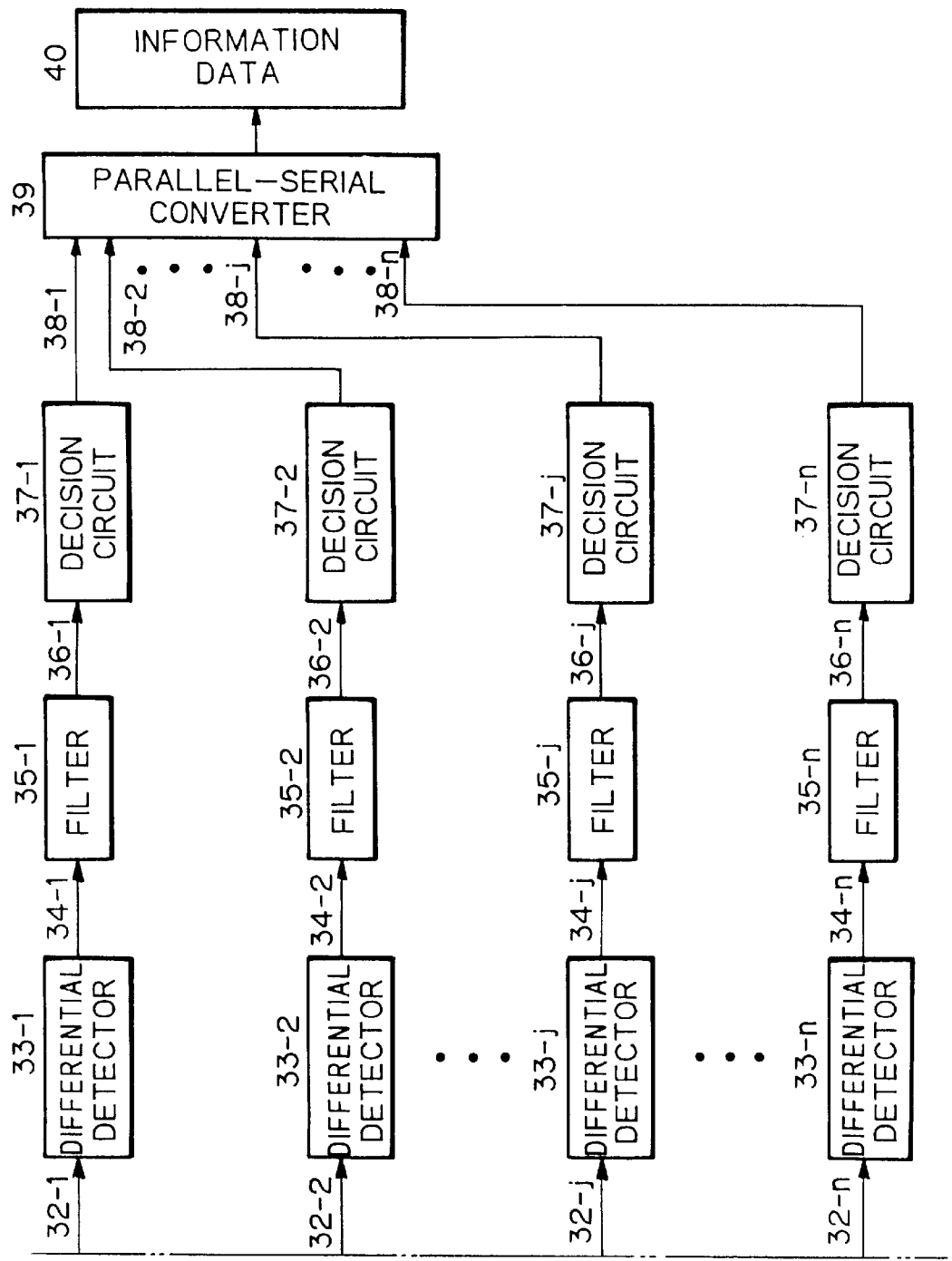

FIG. 2 shows a block diagram of a receiver according to the present invention, in which a number of channels for composite communication channels is n, that is to say, n channels may communicate at the same time. In the figure, the numeral 21 is a composite communication channel receive signal from a transmit station, 22 is a receive filter for removing noise, 23 is an output signal of the filter 22, 24 is an automatic gain control (AGC) for stable operation of a demodulator, 25 is an output signal of the AGC, 26-1 through 26-n are a frequency converter for converting carrier frequency f1-fn of each communication channel in each element channel to a center frequency f0 of a SAW (Surface Acoustic Wave) matched filter 31-1 through 31-n of a receiver. The numerals 27-1 through 27-n are a local oscillator relating to a center frequency f1-fn of each element channel, 28-1 through 28-n are an intermediate frequency signal which is frequency converted, 29-1 through 29-n are a band pass filter for removing noise outside of inband of spread spectrum signal, 30-1 through 30-n are an output signal of each band pass filter, 31-1 through 31-n are a SAW matched filter for deriving desired information signal component from spread spectrum signal, 32-1 through 32-n are an output signal of each SAW matched filter, 33-1 through 33-n are a delay detector for converting an output of a SAW matched filter to a base band signal, 34-1 through 34-n are an output signal of each differential detector, 35-1 through 35-n are a low pass filter for removing harmonic component in an output of a differential detector to derive only desired information signal component, 36-1 through 36-n are a base band signal which includes only desired information signal component, 37-1 through 37-n are a decision circuit for deciding an information signal at a peak point (decision point) of an output signal of a differential detector, 38-1 through 38-n are a decided data for each element channel, 39 is a parallel-serial converter for converting decided parallel data into serial form, and 40 is an information data which is an output of the parallel-serial converter 39.

In FIG. 2, the AGC 24 operates to keep the receive level to a predetermined level, and each differential detector provides a peak level of correlation value depending upon a number of element channels. By detecting said peak level on time axis, a clock timing including symbol timing and sampling timing is reproduced.

It is assumed in the present invention that a number of element channels which compose a composite communication channel is predetermined. Therefore, an output level of each of SAW filters 32-1 32-n is almost constant, and therefore, a peak level of correlation always exceeds a fixed threshold level determined for clock reproduction. Thus, an optimum threshold level for clock reproduction is determined easily. That optimum threshold level has been difficult to determine in a prior art.

It should be noted that the chip timing of the spread spectrum signals of the element channels coincides with one another completely at the input of the SAW matched filters 31-1 through 31-n as described in accordance with FIG. 1, no interference due to a chip timing error between element channels and a PN code occurs, and high quality communication circuit is provided. That chip timing error has been a problem in a prior art.

Further, as for the circuit components used after frequency conversion, the same filter element, the same SAW matched filter element, the same decision element may be used for all the channels, and therefore, the structure of a receive station may be simple, and the cost for the station may be low.

When an independent information data is transmitted for each element channel, no parallel-serial converter 35 is used.

As described above in detail, according to the present invention, in which a single composite channel having a plurality of element channels is used by a plurality of stations, and the signal level of all the element channels is the same as one another, therefore, high rate and high quality communication circuit is provided.

Some of the particular effects of the present invention are as follows.

(1) A plurality of element channels transmitted by a transmit station are in complete synchronized condition by a clock timing of the transmit station. Thus, no interference because of timing error occurs, and high quality communication circuit is provided.

(2) Each communication stations use a plurality of element channels in a single composite channel, and therefore, higher rate communication as compared with a prior art is obtained. Therefore, a wideband multi-media communication, such as a real time transmission of image signal, which has been impossible in a prior art, is realized.

(3) As a number of element channels included in each composite channel is fixed, a receive level at an output of an AGC stage is uniform for all the element channels, and a threshold level for data decision may be fixed. Thus, no complicated control means for establishing synchronization, no precise clock, and no adaptive control for threshold level for data decision are necessary. Thus, the cost of an apparatus is low.

(4) The present invention is used in a multi-cell system with no interference to adjacent areas by using co-channel system. Thus, high quality communication system is obtained with low cost and high efficiency.

From the foregoing it will be apparent that a new and improved spread spectrum communication system has been found. It should be understood of course that the embodiments disclosed are merely illustrative and are not intended to limit the scope of the invention. Reference should be made, therefore, for the appended claims as indicating the scope of the invention rather than the specification.

What is claimed is:

1. A spread spectrum communication system comprising:
   a serial-parallel converter for converting serial information data, called a composite channel, into a plurality of parallel information data, and said each parallel information data being put into a plurality of element channels in parallel form so that each element channel is synchronized with one another, and has a predetermined communication rate,
   a single pseudo noise code generator for generating a common pseudo noise code for all the element channels,
   a plurality of spread spectrum modulators for spreading a signal of each element channel on a frequency axis at a same timing by using the pseudo noise code generated by said pseudo noise code generator, a plurality of local oscillators for providing a plurality of local frequencies with an offset frequency equal to an integer multiple of said communication rate of each element channel, a plurality of modulators for modulating a spread spectrum signal of each element channel with a related local frequency, and a combiner for combining all the modulated signals to send a combined signal to a transmission line.

2. Spread spectrum communication system according to claim 1, wherein said element channels are classified into a plurality of sub composite channels, and a communication station communicates by using one of said sub composite channels.

3. Spread spectrum communication system according to claim 1, wherein each communication station is assigned a time slot of fixed length in a composite channel on time division basis.

4. Spread spectrum communication system according to claim 1, wherein a communication station determines whether a composite channel is free or not, and when it is free said communication station begins to transmit information data.

5. Spread spectrum communication system according to claim 1, wherein a plurality of serial information data are spread in common frequency band by using independent pseudo codes for each serial information data.

* * * * *